United States Patent Office 2,829,041
Patented Apr. 1, 1958

2,829,041

METHOD FOR REDUCING THE CARBON CONTENT OF CARBON-CONTAINING FERROCHROMIUM

John O. Evans, Jr., Michigan City, Ind., assignor to Chromium Mining & Smelting Corporation, Limited, Sault Ste. Marie, Ontario, Canada, a corporation of Canada No Drawing. Application April 26, 1955
Serial No. 504,123

13 Claims. (Cl. 75—.5)

This invention relates to a process for reducing the carbon content of carbon-containing ferrochromium. More particularly, the invention relates to a process for the production of low carbon ferrochromium from high carbon ferrochromium in which the carbon is removed from the high carbon ferrochromium in a process including at least two carbon-removal stages.

The first carbon-removal stage involves oxidizing in a roaster a part of the carbon of the high carbon ferrochromium to an oxide of carbon, with removal of the oxide of carbon and concurrent partial oxidation of some of the metal of the ferrochromium under controlled roasting conditions avoiding runaway exothermic reaction with attendant fusion and excessive burning of the ferrochromium and injury to roaster equipment.

The second carbon-removal stage includes a high temperature, solid state, vacuum treatment of the roasted ferrochromium, with addition of supplemental solid oxidant for the remaining carbon, to yield a gaseous oxide of carbon which is withdrawn from the reaction zone, and a ferrochromium desirably low in carbon and having a high metallic content.

An object of the invention is to provide a process for reducing the carbon content of high carbon ferrochromium that results in improved economy of operation and simplification of operating procedures with the production of ferrochromium having reduced carbon content, or ferrochromium practically free from carbon, and having a relatively high chromium content.

Another object is to provide, in a process as described herein, a process for roasting carbon-containing ferrochromium that is conducted smoothly and without undue exothermicity, whereby ferrochromium is partially freed from carbon and the metal thereof is partially oxidized.

Still another object is to effect a saving in the amount of solid oxidant that is required for elimination of the carbon of ferrochromium or for reduction of the carbon content of ferrochromium to a desirably low value.

Another object is to provide for elimination of a substantial part of the slag that is normally found in high carbon ferrochromium in a first carbon-removal stage.

The foregoing and other aims, objects and advantages of the invention are achieved in a process for reducing or substantially eliminating the carbon of carbon-containing ferrochromium including bringing the ferrochromium into the form of massive granules, roasting the granules in an oxidizing atmosphere at a temperature of from a minimum of about 1000° C. to a maximum of slightly below the fusion point of the material for a time at least sufficient to oxidize a substantial part of the carbon of the ferrochromium to a gaseous oxide of carbon and to leave in the ferrochromium a substantial part of the original carbon. Concurrently, some of the metal of the ferrochromium is oxidized to metal oxide containing insufficient combined oxygen to combine with all of the carbon remaining in the ferrochromium to form oxide of carbon. The granule size range of the ferrochromium is so selected with respect to the roasting conditions, including time and temperature and the oxidizing condition of the roasting atmosphere, that the roasting operation requires heat to be added to the reaction zone to effect partial oxidation of the ferrochromium and the granules of ferrochromium are maintained substantially in the solid state. After roasting, the ferrochromium is preferably cooled, comminuted and mixed with additional finely divided, solid, oxidant for the carbon of the ferrochromium. The mixture is thereafter subjected in a reaction zone without substantial fusion of the material to sub-atmospheric pressure and elevated temperature to effect reaction between the carbon remaining in the ferrochromium and the metal oxides formed in roasting the ferrochromium taken with the added solid oxidant to yield oxide of carbon, particularly carbon monoxide. The oxide of carbon which is gaseous is removed from the reaction zone leaving a ferrochromium low in carbon and high in metallics.

The carbon-containing ferrochromium to which the present process is especially applicable is a ferroalloy usually containing 50% or more of chromium and having a carbon content ranging from about 3% to about 10%, more generally in the range of 6 to 9% carbon. The carbon-containing ferrochromium may be the usual product of the submerged arc electric furnace. It is important that the silicon content of the carbon-containing ferrochromium be kept rather low and the silicon analysis should be in the range of from 1% to 5% silicon, preferably from 1% to 2½% silicon. The balance of the ferroalloy, apart from the chromium, carbon and silicon, is substantially all iron with incidental small amounts of other metals such as aluminum, magnesium and calcium. Preferably also the ferroalloy contains only very small percentages of sulphur and phosphorus.

The first stage of carbon-removal is performed under oxidizing roasting conditions. In this stage partial removal of carbon may conveniently be carried out in a rotary kiln or in a Herreshoff roaster. Any suitable type of roaster may be employed that can be operated under oxidizing conditions and in which the material may be subjected to stirring or agitation. The material is subjected to rabbling, as in a Herreshoff roaster, or to a rolling and tumbling action, as in a rotary kiln, whereby the material undergoing roasting is stirred to expose effectively all of its surfaces to the oxidizing gases in the roaster.

Carbon-containing ferrochromium of the normal commerical grades is highly exothermic when heated at or near its fusion point in an oxidizing atmosphere and a great difficulty has heretofore been encountered in attempting to roast this material. When once ignited, such ferrochromium oxidizes rapidly with release of much heat and attendant rapid rise in temperature. Uncontrolled oxidation and fusion of the material result. Oftentimes the temperature of the roaster rises to a point where serious damage is done to the roasting apparatus. Fusion of the ferrochromium is objectionable in that large masses of ferrochromium are formed that are difficult to process subsequently.

I have found that the degree of oxidation of carbon-containing ferrochromium can be controlled accurately and that a smooth and efficient roasting operation can be accomplished where the granular size of the material charged to the roaster is carefully controlled. I have also found that it is desirable to have the silicon analysis of the charged material within the values indicated hereinbefore in order to avoid uncontrolled oxidation in the roaster. The temperature of the roast is kept below the fusion point of the material as it passes through the roaster but the temperature should be at least about 1000° C. in order that the rate of reaction may proceed at a commercially feasible rate. Maximum roasting temperatures depend upon analysis of the carbon-containing ferrochromium and may be from about 1350° C. to 1400° C.

Of the controllable variables, granular size is of paramount importance. The carbon-containing ferrochromium is usually crushed in a jaw crusher or gyratory crusher, several stages of crushing being employed to reduce the large lumps of cast ferrochromium to the size desired for roaster feed. In the final stage of crushing, the crusher is adjusted to produce a material having a particle size ranging from 1/16" x down to 1/2" x down. The entire sequence of crushing of the carbon-containing ferrochromium is conducted so as to yield a final product having a minimum amount of fines. Of course, it is not possible to entirely eliminate fines, but every effort is made to do so. Where an undue amount of fines is produced the material may be classified to eliminate such fines as may be deleterious in the roasting operation. Excessive quantities of fines in the crushed product increase the likelihood of uncontrolled oxidation in the roaster. The preferred range of granular size for the roaster feed is from 1/8" x down to 3/8" x down.

If the silicon content of the high carbon ferrochromium runs much above 5%, undesirable exothermic roasting may occur; if the silicon content is below about 1%, the roasted material is very hard and tough and is difficult to grind for subsequent processing.

The crushed and, if necessary, sized carbon-containing ferrochromium is charged to a rotary kiln, for example, that is fired at the discharge end with coal or gas. A substantial excess of air over that required for combustion of the fuel is used in order to create an oxidizing atmosphere in the roaster. As the material passes through the roaster, it is rolled and tumbled and thoroughly exposed to the oxidizing atmosphere in the roaster. A minimum temperature of about 1000° C. may be imparted to the charge and the roasting temperature is adjusted as necessary to maintain the charge below the fusion point as it passes through the roaster. Partial oxidation of the material takes place in the roaster without fusion and without a rapid reaction that would cause undesired burning of material and equipment.

The carbon-containing ferrochromium that is fed to the roaster contains a small percentage of slag that is an unwanted impurity. Even with careful cleaning of the feed material some slag always remains. In the roaster, this slag, which has a lower fusion point than the ferrochromium, fuses and separates from the metal. The slag adheres to the surfaces of the roaster and is easily removed on periodical clean-outs of the equipment. This separation of the slag from the metal substantially decreases the amount of slag impurities in the final product.

The material discharged from the kiln is cooled and ground to a fine powder, the majority of which will pass through a 200 mesh screen. This product has a lower carbon content than the material in the roaster. It also contains a quantity of oxygen combined with the metal as metallic oxides. The oxides are believed to be primarily silicon dioxide with some oxides of chromium and iron. The oxide content of the roaster product is insufficient to combine with the residual content of the product to yield carbon monoxide in the subsequent vacuum furnace process for substantial elimination or further reduction or carbon.

The finely ground roasted ferrochromium is mixed with a quantity of solid oxidizing agent, the mixture being proportioned so that at least sufficient oxygen is available therein to combine with the residual carbon to form carbon monoxide. A slight excess of oxidant may be employed over that theoretically needed. The additional solid oxidizing agent may be an oxide of iron or chromium, such as $Fe_2O_3$ or $Cr_2O_3$, or any similar oxide or mixtures thereof that are used for the oxidation of carbon of ferrochromium in the vacuum furnace process.

For the second carbon-removal stage, the mixture of finely roasted ferrochromium and added oxidizing agent is charged to a vacuum retort and reacted at elevated temperature and low absolute pressure to remove carbon and oxygen as gaseous carbon monoxide. After vacuum furnace treatment, the furnace residue is a low carbon ferrochromium, the carbon content of which is usually under 0.10% and may be as low as or even less than 0.01%. The mixture of roasted ferrochromium and solid oxidizing agent may be briquetted prior to the vacuum furnace treatment.

The low carbon product of the vacuum furnace is eminently suited for use in the manufacture of alloy steels, especially chrome-nickel stainless steels and, because of its low carbon content, the product of the process of the present invention finds ready acceptance with alloy steel makers.

The invention will be described with greater particularity and other of its aims, objects and advantages will be pointed out in or will be apparent from the following detailed examples which are given by way of illustration and are not intended to limit the scope of the invention as defined in the claims.

EXAMPLE I

High carbon ferrochromium produced in a submerged-arc electric furnace is cast in chills from the furnace. After cooling, the slag is removed from the metal and the metal is broken into fist-size chunks. The metal is then crushed in a gyratory crusher to nominal 1/4" x down size. The metal as crushed has the following chemical and screen analyses:

*Chemical analysis*

| | Percent |
|---|---|
| Cr | 54.30 |
| Fe | 33.95 |
| C | 8.25 |
| Si | 2.00 |
| Bal. (by diff.) | 1.50 |
| Total | 100.00 |

*Screen analysis*

| | Percent |
|---|---|
| +4 mesh | 0 |
| +8 mesh | 39.5 |
| −8 mesh, +10 mesh | 5.1 |
| −10 mesh, +20 mesh | 14.4 |
| −20 mesh, +60 mesh | 21.3 |
| −60 mesh, +100 mesh | 7.5 |
| −100 mesh | 12.2 |

The crushed high carbon ferrochromium is roasted in a rotary kiln under oxidizing conditions at a maximum operating temperature near the discharge end of kiln of 1250° C. Roasting proceeds smoothly without substantial fusion of the material, although a few nodules or aggregates from one to two inches in diameter are formed.

The roasted material is cooled and ground dry in a ball mill to a fineness of 90% through a 200 mesh screen. The ground, roasted material analyzes chemically:

| | Percent |
|---|---|
| Cr | 53.49 |
| Fe | 33.43 |
| C | 5.40 |
| Si | 1.98 |
| Bal. (by diff.) | 5.70 |

Thus, the roasting step lowers the carbon content of the ferrochromium from 8.25% to 5.40%. It is seen that the percent of "Bal." is increased by the roasting step from 1.50% to 5.70%, a good part of such increase being attributed to oxidation of metal.

Owing to its metal oxide content, the roasted ferrochromium has a self-oxidizing power with respect to the residual carbon which it contains, although there is insufficient oxygen in the material to react with all of the residual carbon to form carbon monoxide. In order to determine the amount of additional oxidant required to oxidize all of the residual carbon of the ferrochromium, a sample of the ground and roasted ferrochromium is introduced into a vacuum furnace and heated to 1300° C. for about 5 hours at a pressure of 100 microns of Hg until gas evolution is substantially complete. The principal gas evolved is carbon monoxide formed in accordance with the typical reaction:

$$Fe_2O_3 + 3C \rightarrow 3CO + 2Fe$$

The foregoing vacuum reaction reduces the carbon content of the roasted ferrochromium from 5.40% to 2.70%.

It is then calculated that the roasted ferrochromium contains sufficient available oxygen to oxidize 2.70% of the residual carbon, or in this case one-half of the residual carbon.

Additional solid oxidant in the form of roasted millscale, $Fe_2O_3$, is required to oxidize one-half of the residual carbon (2.70%) of the roasted ferrochromium. The amount of millscale required on the basis of 100 lbs. of roasted ferrochromium is:

$$2.70 \times \frac{Fe_2O_3}{3C}$$

or $$2.70 \times \frac{159.70}{36} = 11.97 \text{ lbs.}$$

In order to assure substantially complete oxidation of residual carbon of the roasted ferrochromium, 13 lbs. of finely ground roasted millscale is mixed with each 100 lbs. of the roasted and ground ferrochromium. This is an excess of millscale over that theoretically required. The millscale is ground to a fineness of 75% through a 200 mesh screen.

Ten thousand pounds of an intimate mixture in the foregoing proportions of the roasted and ground ferrochromium and roasted and ground millscale is formed into briquettes and the briquettes are reacted in a vacuum furnace at 1215° C. to final pressure of 150 microns of Hg abs. until evolution of gas has substantially ceased. The reaction is complete in about three days. The furnace is cooled and discharged. The low carbon ferrochromium product has the following chemical analysis:

| | Percent |
|---|---|
| Cr | 53.23 |
| Fe | 42.32 |
| C | 0.03 |
| Si | 1.97 |
| Bal. (by diff.) | 2.45 |
| Total | 100.00 |

EXAMPLE II

Another portion of the broken cast metal, as employed in Example I, is crushed to a nominal size of ⅛" by down, somewhat smaller in size than the crushed material used in the immediately preceding example. The crushed material has the same chemical analysis as that of Example I and has the following screen analysis:

*Screen analysis*

| | Percent |
|---|---|
| +8 mesh | 0 |
| −8 mesh, +10 mesh | 15.8 |
| −10 mesh, +20 mesh | 26.2 |
| −20 mesh, +60 mesh | 29.9 |
| −60 mesh, +100 mesh | 9.8 |
| −100 mesh | 18.3 |

The crushed ferrochromium is roasted in a rotary kiln at a maximum temperature at the discharge end of the kiln of 1200° C. which is 50° C. lower than the operating temperature used in Example I. The roasting operation proceeds very smoothly with little or no tendency to form nodules or aggregates.

The roasted ferrochromium after cooling is ball-milled to a fineness of 90% through a 200 mesh screen. The roasted material has the following chemical analysis:

| | Percent |
|---|---|
| Cr | 53.52 |
| Fe | 33.45 |
| C | 4.60 |
| Si | 1.97 |
| Bal. (by diff.) | 6.50 |

A small sample of the ground roasted ferrochromium was self-oxidized in the vacuum furnace at 1300° C. under conditions similar to the self-oxidation of the test sample in Example I. The vacuum furnace product analyzed 1.27% C.

Thus the amount of roasted millscale, $Fe_2O_3$, needed per 100 lbs. of roasted ferrochromium to oxidize 1.27% of the residual carbon is:

$$1.27 \times \frac{159.70}{36} = 5.64 \text{ lbs.}$$

To assure substantially complete oxidation of the residual carbon of the roasted ferrochromium, 6.5 lbs. of ground roasted millscale is mixed with each 100 lbs. of roasted ferrochromium.

Ten thousands pounds of this mixture in briquette form is treated in the vacuum furnace at 1215° C. until evolution of gas has substantially ceased and the final pressure is 150 microns of Hg abs. The product of the vacuum treatment has the following chemical analysis:

| | Percent |
|---|---|
| Cr | 55.79 |
| Fe | 39.69 |
| C | 0.02 |
| Si | 2.05 |
| Bal. (by diff.) | 2.45 |
| Total | 100.00 |

I claim:

1. The process of making low-carbon ferrochromium containing at least approximately 50% chromium and from about 3% to 10% of carbon from massive lumps of high-carbon ferrochromium which comprises reducing the massive lumps of high-carbon ferrochromium to a granule size of from 1/16" diameter to ½" diameter, roasting the granules of high-carbon ferrochromium in an oxidizing atmosphere at a temperature of from 1000° C. to 1400° C. and below the point of substantial fusion of the ferrochromium granules to oxidize a portion of the carbon of the high-carbon ferrochromium to an oxide of carbon and to oxidize a portion of the metal of the high-carbon ferrochromium, the oxygen of the metal oxides in the roasted product being insufficient to combine with all of the residual carbon of the roasted product to form carbon monoxide, comminuting the roasted product, mixing the comminuted roasted product with additional finely divided solid oxidant for the residual carbon thereof, and reacting the mixture substantially in the solid state at elevated temperature and subatmospheric pressure for a time sufficient to react the oxides of the mixture with the carbon of the mixture to form an oxide of carbon, removing oxide of carbon from the reactants and recovering low-carbon ferrochromium in the residue.

2. The process of making low-carbon ferrochromium containing at least approximately 50% chromium and from about 3% to 10% of carbon from massive lumps of high-carbon ferrochromium which comprises reducing the massive lumps of high-carbon ferrochromium to a granule size of from 1/16" diameter to ½" diameter, roasting the granules of high-carbon ferrochromium by rolling and tumbling the granules in an oxidizing atmosphere at a temperature of from 1000° C. to 1400° C. and below the point of substantial fusion of the ferrochromium granules to oxidize a portion of the carbon of the high-carbon ferrochromium to an oxide of carbon and to oxidize a portion of the metal of the high-carbon ferrochromium, the oxygen of the metal oxides in the roasted product being insufficient to combine with all of the residual carbon of the roasted product to form carbon monoxide, comminuting the roasted product, mixing the comminuted roasted product with additional finely divided solid oxidant for the residual carbon thereof, and reacting the mixture substantially in the solid state at elevated temperature and subatmospheric pressure for a time sufficient to react the oxides of the mixture with the carbon of the mixture to form an oxide of carbon, removing oxide of carbon from the reactants and recovering low-carbon ferrochromium in the residue.

3. The process of making low-carbon ferrochromium containing at least approximately 50% chromium and from about 3% to 10% of carbon from massive lumps of high-carbon ferrochromium which comprises reducing the massive lumps of high-carbon ferrochromium to a granule size of from 1/16" diameter to 1/2" diameter, roasting the granules of high-carbon ferrochromium in an oxiding atmosphere at a temperature of from 1000° C. to 1400° C. and below the point of substantial fusion of the ferrochromium granules to oxidize a portion of the carbon of the high-carbon ferrochromium to an oxide of carbon and to oxidize a portion of the metal of the high-carbon ferrochromium, the high-carbon ferrochromium containing not more than about 5% silicon, the oxygen of the metal oxides in the roasted product being insufficient to combine with all of the residual carbon of the roasted product to form carbon monoxide, comminuting the roasted product, mixing the comminuted roasted product with additional finely divided solid oxidant for the residual carbon thereof, and reacting the mixture substantially in the solid state at elevated temperature and subatmospheric pressure for a time sufficient to react the oxides of the mixture with the carbon of the mixture to form an oxide of carbon, removing oxide of carbon from the reactants and recovering low-carbon ferrochromium in the residue.

4. The process of making low-carbon ferrochromium containing at least approximately 50% chromium and from about 3% to 10% of carbon from massive lumps of high-carbon ferrochromium which comprises reducing the massive lumps of high-carbon ferrochromium to a granule size of from 1/16" diameter to 1/2" diameter, roasting the granules of high-carbon ferrochromium in an oxidizing atmosphere at a temperature of from 1000° C. to 1400° C. and below the point of substantial fusion of the ferrochromium granules to oxidize a portion of the carbon of the high-carbon ferrochromium to an oxide of carbon and to oxidize a portion of the metal of the high-carbon ferrochromium, the high-carbon ferrochromium containing from 1% to 2½% silicon, the oxygen of the metal oxides in the roasted product being insufficient to combine with all of the residual carbon of the roasted product to form carbon monoxide, comminuting the roasted product, mixing the comminuted roasted product with additional finely divided solid oxidant for the residual carbon thereof, and reacting the mixture substantially in the solid state at elevated temperature and subatmospheric pressure for a time sufficient to react the oxides of the mixture with the carbon of the mixture to form an oxide of carbon, removing oxides of carbon from the reactants and recovering low-carbon ferrochromium in the residue.

5. The process of making low-carbon ferrochromium containing at least approximately 50% chromium and from about 3% to 10% of carbon from massive lumps of high-carbon ferrochromium which comprises reducing the massive lumps of high-carbon ferrochromium to a granule size of from 1/16" diameter to 1/2" diameter, roasting the granules of high-carbon ferrochromium by rolling and tumbling the granules in an oxidizing atmosphere at a temperature of from 1000° C. to 1400° C. and below the point of substantial fusion of the ferrochromium granules to oxidize a portion of the carbon of the high-carbon ferrochromium to an oxide of carbon and to oxidize a portion of the metal of the high-carbon ferrochromium, the high-carbon ferrochromium containing from 1% to 2½% silicon, the oxygen of the metal oxides in the roasted product being insufficient to combine with all of the residual carbon of the roasted product to form carbon monoxide, comminuting the roasted product, mixing the comminuted roasted product with additional finely divided solid oxidant for the residual carbon thereof, and reacting the mixture substantially in the solid state at elevated temperature and subatmospheric pressure for a time sufficient to react the oxides of the mixture with the carbon of the mixture to form an oxide of carbon, removing oxide of carbon from the reactants and recovering low-carbon ferrochromium in the residue.

6. The method of making low carbon ferrochromium substantially free of oxides which comprises the steps of roasting comminuted ferrochromium containing at least approximately 50% chromium and from about 3% to 10% of carbon in an oxidizing atmosphere at a temperature of from 1000° C. to 1400° C. until a substantial portion of the carbon has been driven off and the weight of metal oxides has been increased, of cooling and comminuting the interim product, of adding a metallic oxide ground to comparable size in a quantity which with the oxygen in the oxides of the partially reduced ferrochromium is sufficient to decarbonize fully the product, and of reacting the mixture substantially in the absence of additional oxygen at requisite temperature to drive off the carbon and leave low carbon ferrochromium with a low percentage of oxides.

7. The method of claim 6 wherein the ferrochromium originally treated contains minor amounts of other metals and wherein the metallic oxide added is iron oxide.

8. The method of claim 6 wherein the metallic oxide added is iron oxide and wherein an additional step of briquetting by pressure is performed immediately before the final heating.

9. The method of claim 6 wherein up to five percent of the initial ferrochromium is silicon.

10. The method of claim 6 wherein the product of the roasting step together with the added iron oxide is first briquetted before the final heating.

11. The process of making low carbon ferrochromium from high carbon ferrochromium which comprises roasting granules of high carbon ferrochromium containing at least approximately 50% chromium and from about 3% to 10% of carbon in an oxidizing atmosphere at a temperature of from 1000° C. to 1400° C. and below the point of substantial fusion of the ferrochromium granules to oxidize a portion of the carbon of the high-carbon ferrochromium to an oxide of carbon and to oxidize a portion of the metal of the high-carbon ferrochromium, the oxygen of the metal oxides in the roasted product being insufficient to combine with all of the residual carbon of the roasted product to form carbon monoxide, mixing the roasted product with finely divided iron oxide and reacting the mixture substantially in the solid state at elevated temperature and subatmospheric pressure for a time sufficient to react the oxides of the mixture with the carbon of the mixture to form an oxide of carbon, removing oxide of carbon from the reactants and recovering low-carbon ferrochromium in the residue.

12. The method of producing low carbon ferrochromium in lump form which comprises the steps of roasting comminuted high carbon ferrochromium containing at least approximately 50% chromium and from about 3% to 10% of carbon in an oxidizing atmosphere at a temperature of 1000° C. to 1400° C. to reduce partially the carbon content and to partially re-oxidize the iron and chromium, of cooling and comminuting the product of the first step and mixing therewith a sufficient quantity of metallic oxide to provide enough oxygen to combine with all carbon, of placing the comminuted product in forms of a desired finished lump size, and of reacting the mixture substantially in the absence of additional oxygen at requisite temperatures to drive off the carbon and leave low carbon ferrochromium with a low percentage of oxides.

13. The process of claim 11 wherein the finely divided iron oxide is millscale.

References Cited in the file of this patent

FOREIGN PATENTS 539,461     Great Britain _____ Sept. 11, 1941

U. S. DEPARTMENT OF COMMERCE

PATENT OFFICE

CERTIFICATE OF CORRECTION

Patent No. 2,829,041     John O. Evans, Jr.     April 1, 1958

It is hereby certified that error appears in the printed specification of the above numbered patent requiring correction and that the said Letters Patent should read as corrected below.

Column 6, lines 46 and 47, 71 and 72, and column 7, lines 21 and 22, 47 and 48, and 73 and 74, strike out "containing at least approximately 50% chromium and from about 3% to 10% of carbon" and insert the same after "ferrochromium", in column 6, lines 48, and 73, and column 7, lines 23, 49, and 75, in each occurrence.

Signed and sealed this 27th day of May 1958.

(SEAL)
Attest:

KARL H. AXLINE
Attesting Officer

ROBERT C. WATSON
Commissioner of Patents